US012791168B2

(12) United States Patent
Lu et al.

(10) Patent No.: US 12,791,168 B2
(45) Date of Patent: Nov. 10, 2026

(54) STRIP LIGHT WITH A LIGHT-EMITTING ANGLE ADJUSTING FUNCTION

(71) Applicant: Xiamen PVTECH Co., Ltd., Xiamen (CN)

(72) Inventors: Fuxing Lu, Xiamen (CN); Sijia Wang, Xiamen (CN); Jinsheng Li, Xiamen (CN)

(73) Assignee: Xiamen PVTECH Co., Ltd., Xiamen (CN)

( * ) Notice: Subject to any disclaimer, the term of this patent is extended or adjusted under 35 U.S.C. 154(b) by 0 days.

(21) Appl. No.: 19/045,567

(22) Filed: Feb. 5, 2025

(65) Prior Publication Data

US 2025/0251113 A1 Aug. 7, 2025

(30) Foreign Application Priority Data

Feb. 7, 2024 (CN) ........................ 202420289403.1

(51) Int. Cl.

*F21V 17/02* (2006.01)
*F21S 8/06* (2006.01)
*F21V 1/08* (2006.01)
*F21V 15/015* (2006.01)
*F21V 23/06* (2006.01)
*F21Y 115/10* (2016.01)

(52) U.S. Cl.

CPC .............. *F21V 17/02* (2013.01); *F21S 8/061* (2013.01); *F21V 1/08* (2013.01); *F21V 15/015* (2013.01); *F21V 23/06* (2013.01); *F21Y 2115/10* (2016.08)

(58) Field of Classification Search

CPC .......... F21S 8/061; F21V 1/08; F21V 15/015; F21V 23/06; F21Y 2115/10

See application file for complete search history.

(56) References Cited

U.S. PATENT DOCUMENTS 2,331,811 A * 10/1943 Sprecher ................ F21V 17/02
362/225
2020/0340633 A1* 10/2020 Chen ....................... F21S 8/061

FOREIGN PATENT DOCUMENTS

CA 2998133 A1 * 9/2018 ............ F21V 15/013
CN 108884986 A * 11/2018 .............. F21V 7/005
CN 120969768 A * 11/2025 .......... F21V 33/0012

* cited by examiner

*Primary Examiner* — Anabel Ton
(74) *Attorney, Agent, or Firm* — BruceStone LLP; Joseph A. Bruce

(57) ABSTRACT

A strip light with a light-emitting angle adjusting function includes a frame base, a light source board, a light cover and two side wings. The frame base has two side arms disposed at the two sides thereof. Each of the side arms is provided with a first slot and a second slot. The light source board is disposed on the inner surface of the frame base. The light cover is disposed on the side arms and covers the light source board. Each of the side wings has a hook-shaped structure at one end thereof. Each of the hook-shaped structures is movably engaged with the first slot or the second slot, such that the two side wings are attached to the two sides of the frame base.

9 Claims, 9 Drawing Sheets

STRIP LIGHT WITH A LIGHT-EMITTING ANGLE ADJUSTING FUNCTION

BACKGROUND OF THE INVENTION

1. Field of the Invention

The present invention relates to a lighting device, in particular to a strip light with a light-emitting angle adjusting function.

2. Description of the Prior Art

Currently available LED lights used in stores are designed for installation on standard ceilings or light steel frames. These LED lights offer the advantages of easy installation and maintenance, energy efficiency, high brightness, and compact size, significantly improving the lighting efficiency of ceiling or light steel frame fixtures while reducing power consumption. However, the light-emitting angle of these LED lights is fixed, and the materials used for the side wings of these LED lights are uniform and lack special textures, which can result in yellow spots in certain situations. Furthermore, these lights cannot meet the requirements for some applications if these applications need different light-emitting angles.

SUMMARY OF THE INVENTION

One embodiment of the present invention provides a strip light with a light-emitting angle adjusting function (strip lights are usually used in stores, which are also called shop lights), which includes a frame base, a light source board, a light cover and two side wings. The frame base has two side arms disposed at the two sides thereof. Each of the side arms is provided with a first slot and a second slot. The light source board is disposed on the inner surface of the frame base. The light cover is disposed on the side arms and covers the light source board. Each of the side wings has a hook-shaped structure at one end thereof. Each of the hook-shaped structures is movably engaged with the first slot or the second slot, such that the two side wings are attached to the two sides of the frame base.

In one embodiment, the frame base includes a main body. The side arms extend outwardly and obliquely from two sides of the main body, and there is an inner included angle between the main body and each of the side arms.

In one embodiment, the first slot is adjacent to the main body, while the second slot is away from the main body. The first slot and the second slot are disposed on different horizontal axes and vertical axes.

In one embodiment, the frame base includes a plurality of hook elements disposed on the side arms. The first slot and the second slot of each of the side arms are disposed within the hook elements.

In one embodiment, each of the hook elements includes an extension portion and a support portion, and the support portion is bent and extends toward the extension portion. The extension portion corresponding to the first slot and the main body are disposed on the same horizontal axis, while the extension portion corresponding to the second slot and the main body are disposed on different horizontal axes.

In one embodiment, the hook-shaped structure of each of the side wings includes a hook portion and a curved portion. The hook portion is engaged between the extension portion and the support portion, while the curved portion presses against the exterior of the support portion.

In one embodiment, when each of the hook-shaped structures is engaged with the first slot corresponding thereto, a first light-emitting angle is formed between the first side wings. When each of the hook-shaped structures is engaged with the second slot corresponding thereto, a second light-emitting angle is formed between the first side wings. The first light-emitting angle is less than the second light-emitting angle.

In one embodiment, each of the side wings has two surfaces, and one of the surfaces is a polished surface and the other of the surfaces is a prismatic surface.

In one embodiment, the strip light further includes a plurality of end caps fixed to two ends of the frame base to restrict the positions of the side wings.

In one embodiment, the strip light further includes a power socket disposed on one side of the end cap.

The strip light according to the embodiments of the present invention can be applied to various stores and offers the following structural features: the side wings are separated from the main body and movable, which can reduce packaging space. The hook-shaped structures of the side wings can achieve easy installation with the aluminum frame base (aluminum profile). The structure of the strip light is simple, and the side wings and aluminum frame base can be manufactured by extrusion molding, which is a mature manufacturing process and can ensure low cost. The components are connected via the simple hook-shaped structures without the need for additional auxiliary parts. The hook-shaped structures of the side wings are detachable, reducing packaging width by 45% while maintaining the same height. This simple structure achieves low cost and reliable strength while meeting functional requirements. Material texture characteristics: the special texture reduces scattering and yellow spots. Optical characteristics: the light effect utilization and light-emitting uniformity can be balanced by adjusting the side wings according to different needs. The hook-shaped structures of the side wings have two surfaces, which can be treated with different surface processes. It is possible to choose the polished surfaces or prismatic surfaces based on actual requirements. The polished surface achieves optical effects with sharp boundaries, while the transitions.

Further scope of applicability of the present application will become more apparent from the detailed description given hereinafter. However, it should be understood that the detailed description and specific examples, while indicating exemplary embodiments of the present invention, are given by way of illustration only, since various changes and modifications within the spirit and scope of the present invention will become apparent to those skilled in the art from this detailed description.

These and other objectives of the present invention will no doubt become obvious to those of ordinary skill in the art after reading the following detailed description of the preferred embodiment that is illustrated in the various figures and drawings.

BRIEF DESCRIPTION OF THE DRAWINGS

The present invention will become more fully understood from the detailed description given herein below and the accompanying drawings which are given by way of illustration only, and thus are not limitative of the present invention and wherein.

DETAILED DESCRIPTION

Figure 1:
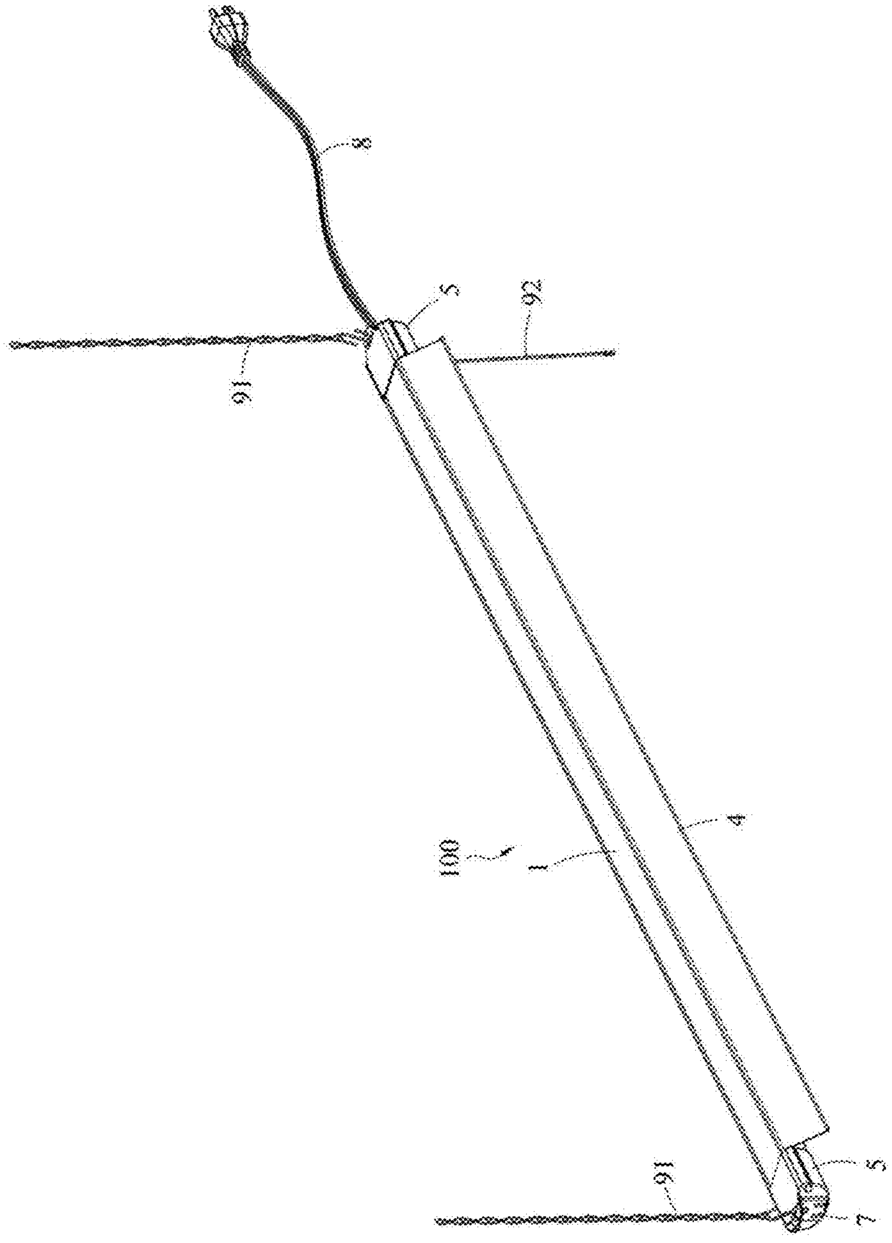
FIG. 1 is a perspective view of a strip light in accordance with one embodiment of the present invention.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing. It should be understood that, when it is described that an element is "coupled" or "connected" to another element, the element may be "directly coupled" or "directly connected" to the other element or "coupled" or "connected" to the other element through a third element. In contrast, it should be understood that, when it is described that an element is "directly coupled" or "directly connected" to another element, there are no intervening elements.

Please refer to FIG. 1, which is a perspective view of a strip light in accordance with one embodiment of the present invention. The strip light 100 can be used for various stores and is also called shop light. The strip light 100 is provided with multiple connecting elements 91 (such as hanging ropes, hooks, or chains). These connecting elements 91 can be fixed to the hooks or buckle rings on the walls of these stores, such that the strip light 100 can emit light toward merchandise from the wall.

Figure 2:
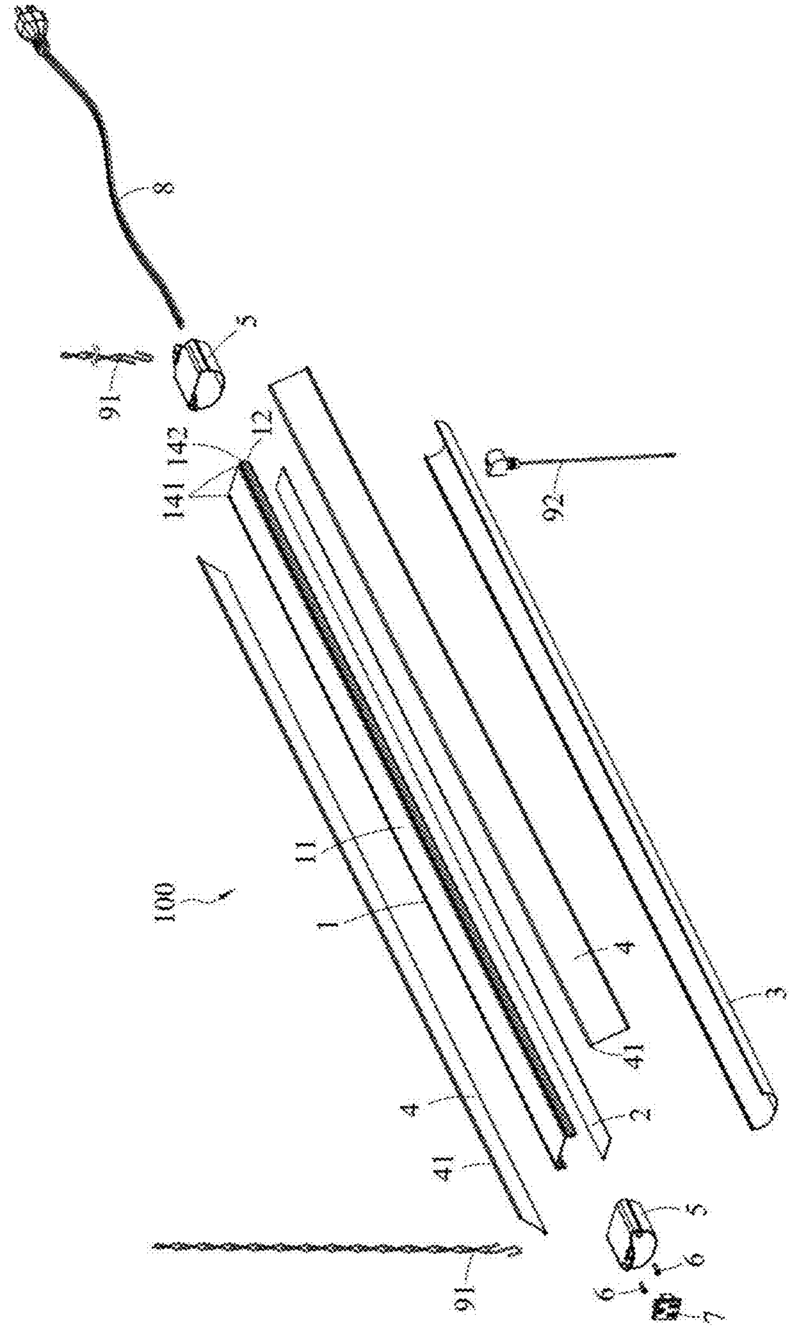
FIG. 2 is an exploded view of the strip light in accordance with one embodiment of the present invention.
Figure 3:
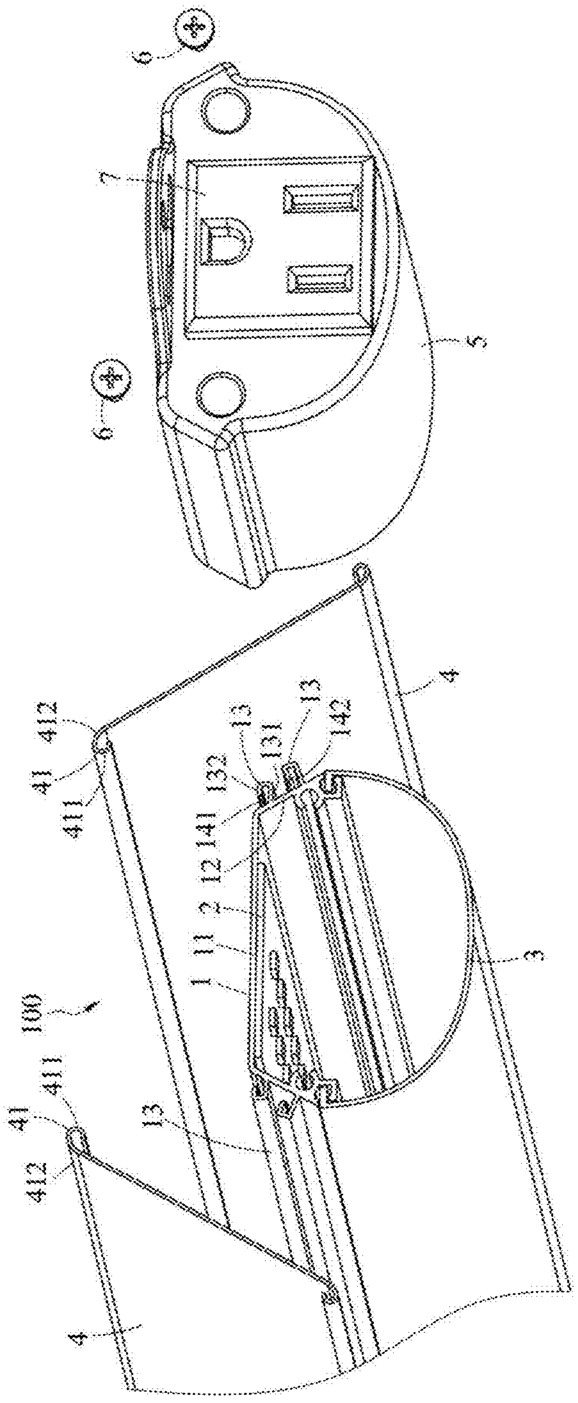
FIG. 3 is a partial schematic view for illustrating assembling the strip light in accordance with one embodiment of the present invention.
Figure 4:
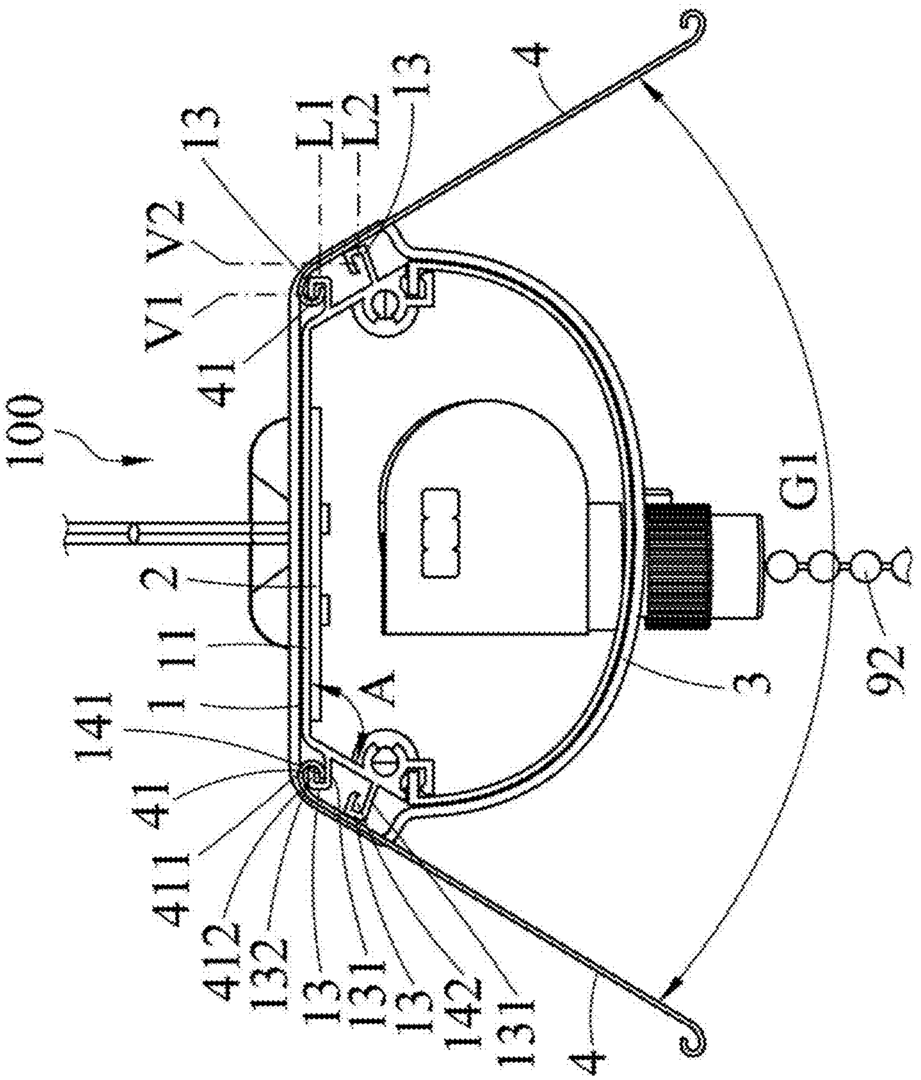
FIG. 4 is a first side view of the strip light in accordance with one embodiment of the present invention, which illustrate that two side wings are engaged with first slots.
Figure 5:
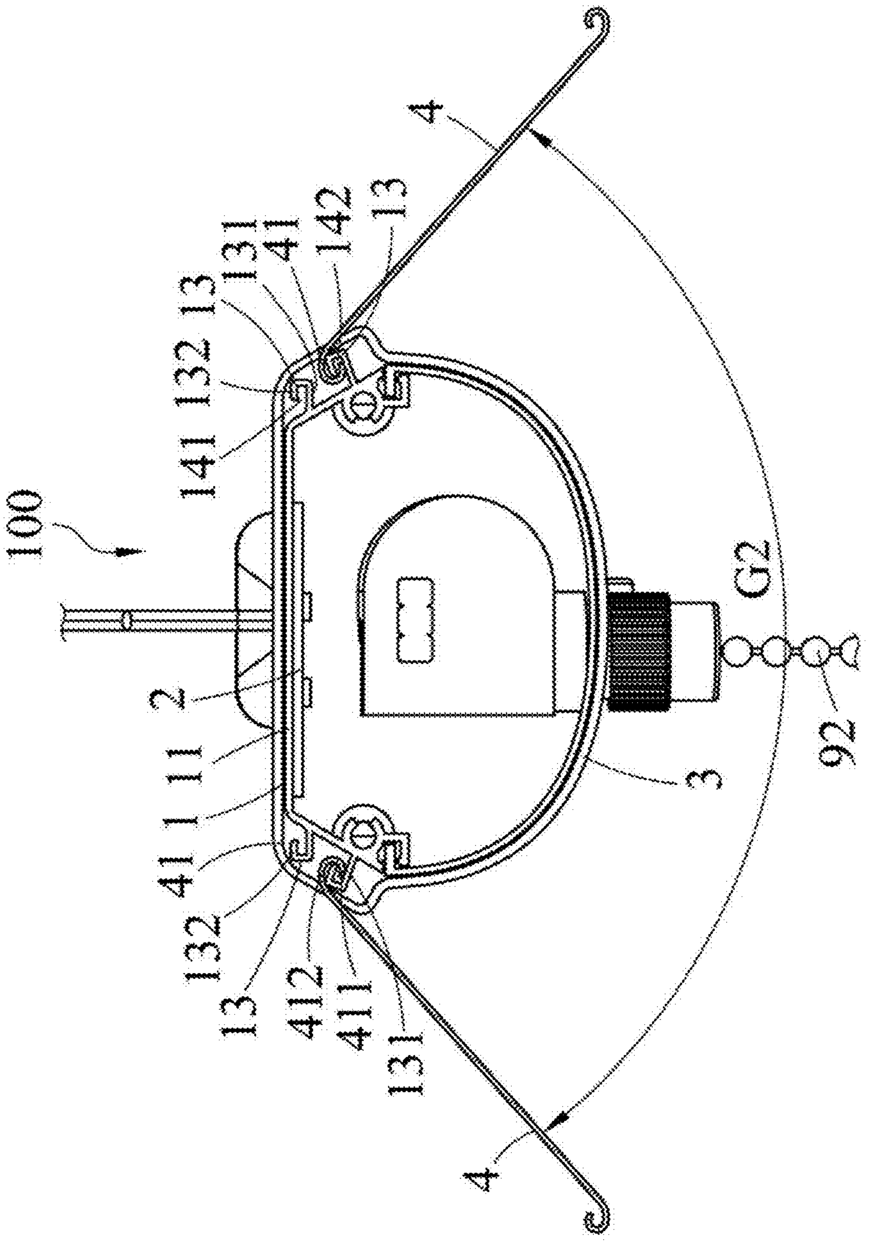
FIG. 5 is a second side view of the strip light in accordance with one embodiment of the present invention, which illustrate that the side wings are engaged with second slots.

Please refer to FIG. 2 and FIG. 3. FIG. 2 is an exploded view of the strip light in accordance with one embodiment of the present invention. FIG. 3 is a partial schematic view for illustrating assembling the strip light in accordance with one embodiment of the present invention. The strip light 100 is designed for adjustable light-emitting angle and includes a frame base 1, a light source board 2, a light cover 3, and two side wings 4. The frame base 1 is an aluminum profile (made by manufactured by extrusion molding), which can achieve great thermal conduction and heat dissipation effects. The frame base 1 has two side arms 12 disposed the two sides thereof. Each side arm 12 is provided with a first slot 141 and a second slot 142. The light source board 2 is disposed on the inner surface of the frame base. The light cover 3 is disposed on the side arms 12 of the frame base and covers the light source board 2. Each side wing 4 has a hook-shaped structure 41 at one end thereof, which can be movably engaged with the first slot 141 (as shown in FIG. 4) or the second slot 142 (as shown in FIG. 5), such that the side wings 4 can be attached to the two sides of the frame base 1.

In some embodiments, the frame base 1 includes a main body 11, with two side arms 12 extending obliquely outward from the two sides of the main body 11. The cross-section of the main body 11 and the side arms 12 roughly forms a trapezoidal shape. An inner included angle A is formed between the main body 11 and each of the side arms 12, where the inner included angle A is greater than 90 degrees.

In some embodiments, the strip light 100 further includes a plurality of end caps 5. Each end cap 5 is secured to the two ends of the frame base 1 using screws 6, thereby restricting the positions of the two side wings 4.

In some embodiments, the strip light 100 includes a power wire 8 connected to an external power source. The power wire 8 passes through the end cap 5 and connects to the light source board 2 to power the LEDs of the light source board 2. The light source board 2 contains one or more sets of LEDs with varying color temperatures.

In some embodiments, the strip light 100 includes a power socket 7 disposed on one side of the end cap 5. The strip light 100 also includes one or two multifunctional drivers and pull cord switches 92.

Please refer to FIG. 3 to FIG. 5, FIG. 4 is a first side view of the strip light in accordance with one embodiment of the present invention, which illustrate that the side wings 4 are engaged with the first slots 141. FIG. 5 is a second side view of the strip light in accordance with one embodiment of the present invention, which illustrate that the side wings 4 are engaged with the second slots 142. The side wings 4 are detachable. The user can choose to engage the side wings 4 with either the first slots 141 or the second slots 142 in order to change the angle between the side wings 4, such that the light-emitting angle of the light emitted from the light source board 2 is changeable. Furthermore, the detachable side wing design reduces packaging space and facilitates flexible installation and convenient removal.

In some embodiments, the frame base 1 includes a plurality of hook elements 13 disposed on the side arms 12. The first slot 141 and the second slot 142 are disposed within these hook elements 13. The cross-section of each hook element 13 resembles a rotated U-shape (rotated 90 degrees). Each hook element 13 includes an extension portion 131 and a support portion 132, which is bent and extends toward the extension portion 131. The extension portion 131 corresponding to the first slot 141 and the main body 11 are disposed on the same horizontal axis, while the extension portion 131 corresponding to the second slot 142 is disposed on a different horizontal axis from the main body 11. There is an included angle between the extension portion 131 corresponding to the second slot 142 and the main body 11.

In some embodiments, the hook-shaped structure 41 of each side wing 4 includes a hook portion 411 and a curved portion 412. When the hook-shaped structure 41 of each side wing 4 is engaged with either the first slot 141 or the second slot 142, the hook portion 411 is engaged between the extension portion 131 and the support portion 132, and the curved portion 412 presses against the exterior of the support portion 132.

Figure 6:
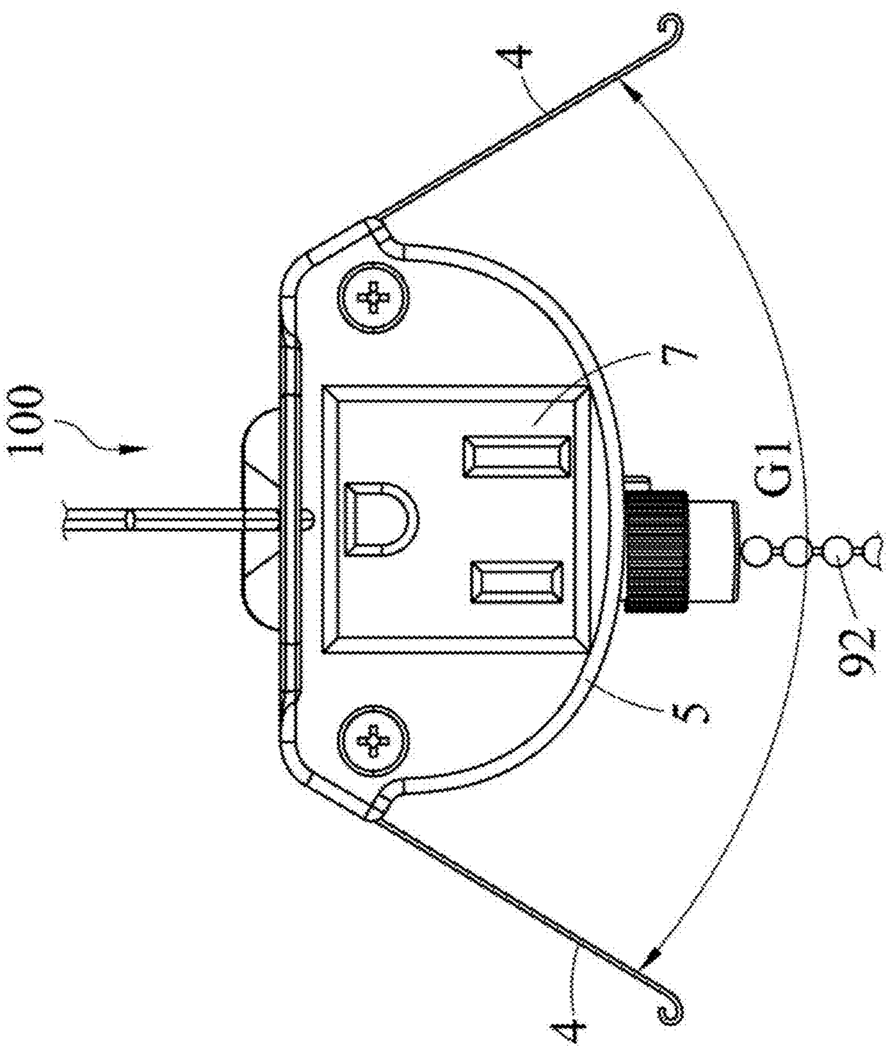
FIG. 6 is a third side view of the strip light in accordance with one embodiment of the present invention, which illustrate that there is a first light-emitting angle between the side wings.
Figure 7:
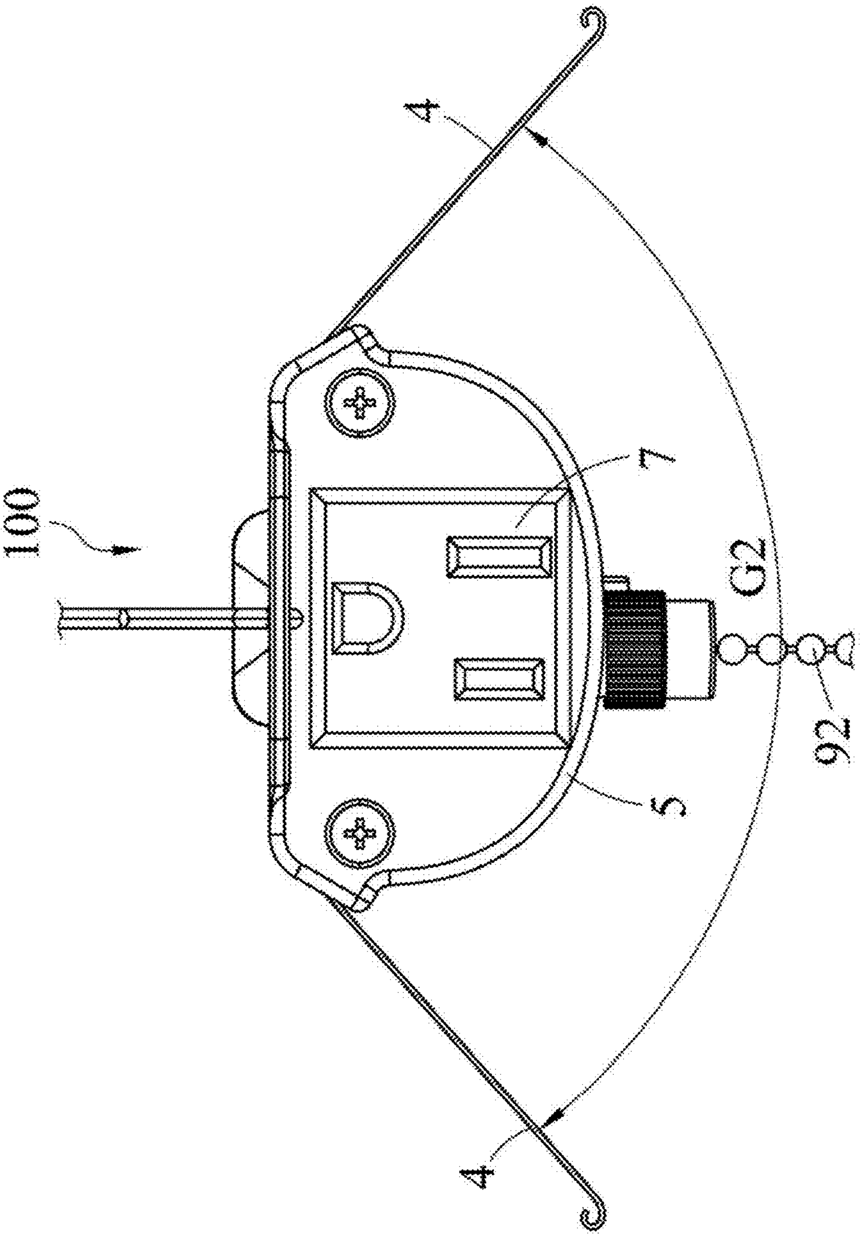
FIG. 7 is a fourth side view of the strip light in accordance with one embodiment of the present invention, which illustrate that there is a second light-emitting angle between the side wings.

Referring to FIG. 3 to FIG. 7. FIG. 6 is a third side view of the strip light in accordance with one embodiment of the present invention, which illustrate that there is a first light-emitting angle G1 between the side wings 4. FIG. 7 is a fourth side view of the strip light in accordance with one embodiment of the present invention, which illustrate that there is a second light-emitting angle G2 between the side wings 4. In some embodiments, the first slot 141 is adjacent to the main body 11, while the second slot 142 is away from the main body 11. The first slot 141 and the second slot 142 are disposed on different horizontal axes L1, L2, and different vertical axes V1, V2. When the two side wings 4 are mounted on the two side arms 12, their angles, positions, and light-emitting angles can be varied based on the positions and angles of the first slots 141 and the second slots 142. Specifically, when the hook-shaped structures 41 are engaged with the first slots 141, the two side wings 4 form a first light-emitting angle G1. When the hook-shaped structures 41 are engaged with the second slots 142, the two side wings 4 form a second light-emitting angle G2. The first light-emitting angle G1 is less than the second light-emitting angle G2. The first light-emitting angle G1 is approximately 118 degrees and the second light-emitting angle G2 is approximately 140 degrees.

Figure 8:
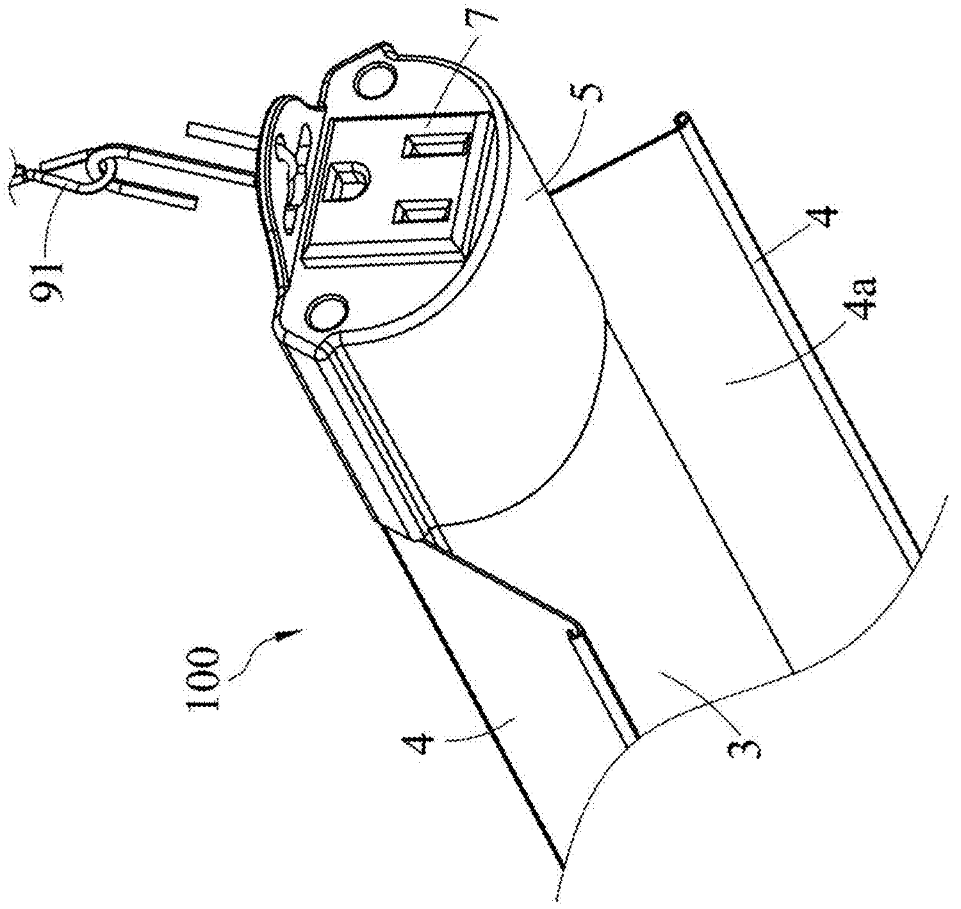
FIG. 8 is a partial schematic view of a bottom appearance of the strip light in accordance with one embodiment of the present invention.
Figure 9:
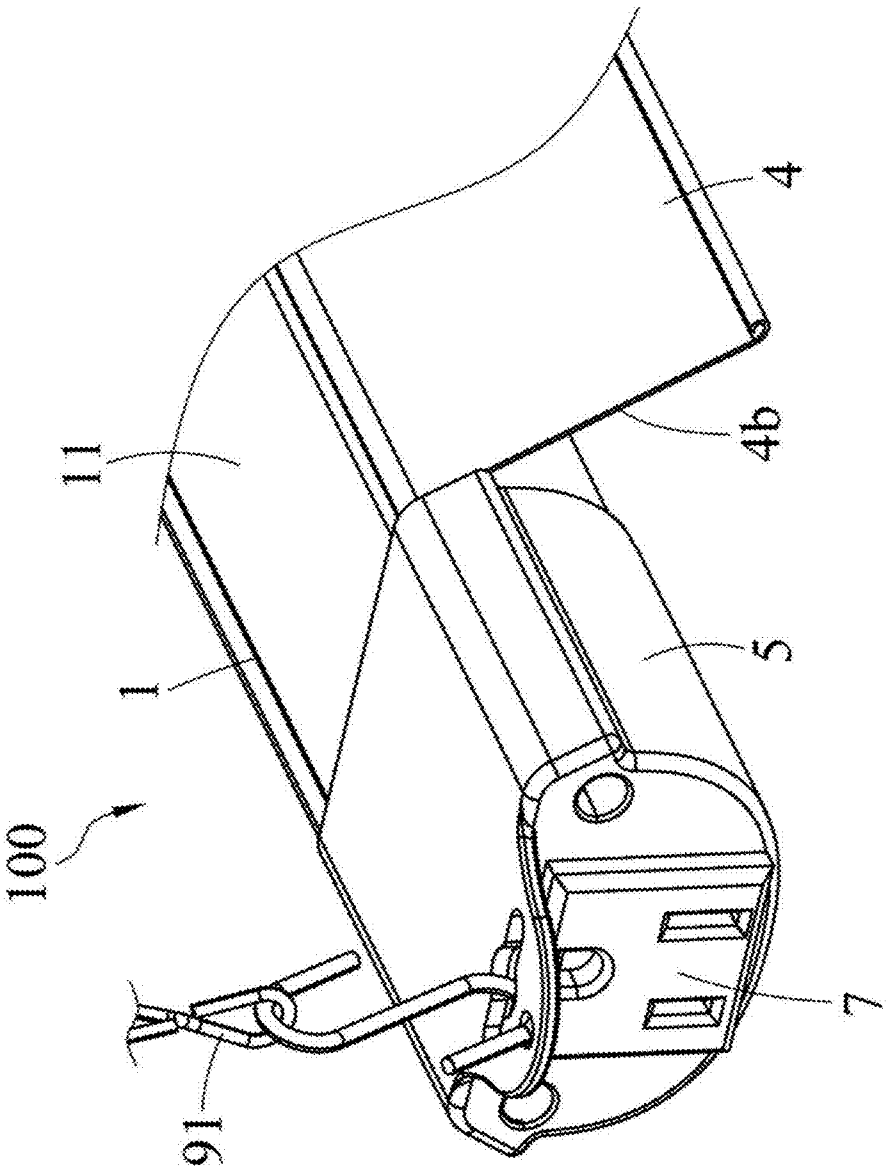
FIG. 9 is a partial schematic view of a top appearance of the strip light in accordance with one embodiment of the present invention.

Referring to FIG. 2, FIG. 8, and FIG. 9. FIG. 8 is a partial schematic view of a bottom appearance of the strip light in accordance with one embodiment of the present invention. FIG. 9 is a partial schematic view of a top appearance of the strip light in accordance with one embodiment of the present invention. In some embodiments, each side wing 4 has a polished surface 4*a* on one side and a prismatic surface 4*b* on the other, forming a dual-textured surface. One side is a highly smooth plane, while the other has a functional texture. Either the polished surface 4*a* or the prismatic surface 4*b* can be selected for each side wing 4 as needed. The side wings 4 with different surface treatments enhance lighting performance when used in stores. The textured surface reduces scattering, improves light uniformity, and minimizes yellow spots, while the smooth surface increases light efficiency for applications where high light efficiency is required.

The strip light according to the embodiments of the present invention can be applied to various stores and offers the following structural features: the side wings are separated from the main body and movable, which can reduce packaging space. The hook-shaped structures of the side wings can achieve easy installation with the aluminum frame base (aluminum profile). The structure of the strip light is simple, and the side wings and aluminum frame base can be manufactured by extrusion molding, which is a mature manufacturing process and can ensure low cost. The components are connected via the simple hook-shaped structures without the need for additional auxiliary parts. The hook-shaped structures of the side wings are detachable, reducing packaging width by 45% while maintaining the same height. This simple structure achieves low cost and reliable strength while meeting functional requirements. Material texture characteristics: the special texture reduces scattering and yellow spots. Optical characteristics: the light effect utilization and light-emitting uniformity can be balanced by adjusting the side wings according to different needs. The hook-shaped structures of the side wings have two surfaces, which can be treated with different surface processes. It is possible to choose the polished surfaces or prismatic surfaces based on actual requirements. The polished surface achieves optical effects with sharp boundaries, while the transitions.

It will be apparent to those skilled in the art that various modifications and variations can be made to the disclosed embodiments. It is intended that the specification and examples be considered as exemplary only, with a true scope of the present invention being indicated by the following claims and their equivalents.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A strip light with a light-emitting angle adjusting function, comprising:

- a frame base having two side arms disposed at two sides thereof, wherein each of the side arms is provided with a first slot and a second slot, wherein the frame base comprises a main body, and the side arms extend outwardly and obliquely from two sides of the main body, and there is an inner included angle between the main body and each of the side arms;
- a light source board disposed on an inner surface of the frame base;
- a light cover disposed on the side arms and covering the light source board; and
- two side wings, each having a hook-shaped structure at one end thereof, wherein each of the hook-shaped structures is movably engaged with the first slot or the second slot, whereby the two side wings are attached to the two sides of the frame base.

2. The strip light with the light-emitting angle adjusting function as claimed in claim 1, wherein the first slot is adjacent to the main body, while the second slot is away from the main body, and the first slot and the second slot are disposed on different horizontal axes and vertical axes.

3. The strip light with the light-emitting angle adjusting function as claimed in claim 2, wherein the frame base comprises a plurality of hook elements disposed on the side arms, and the first slot and the second slot of each of the side arms are disposed within the hook elements.

4. The strip light with the light-emitting angle adjusting function as claimed in claim 3, wherein each of the hook elements comprises an extension portion and a support portion, and the support portion is bent and extends toward the extension portion, wherein the extension portion corresponding to the first slot and the main body are disposed on a same horizontal axis, while the extension portion corresponding to the second slot and the main body are disposed on different horizontal axes.

5. The strip light with the light-emitting angle adjusting function as claimed in claim 4, wherein the hook-shaped structure of each of the side wings comprises a hook portion and a curved portion, and the hook portion is engaged between the extension portion and the support portion, while the curved portion presses against an exterior of the support portion.

6. The strip light with the light-emitting angle adjusting function as claimed in claim 2, wherein when each of the hook-shaped structures is engaged with the first slot corresponding thereto, a first light-emitting angle is formed between the first side wings, wherein when each of the hook-shaped structures is engaged with the second slot corresponding thereto, a second light-emitting angle is formed between the first side wings, and the first light-emitting angle is less than the second light-emitting angle.

7. The strip light with the light-emitting angle adjusting function as claimed in claim 1, wherein each of the side wings has two surfaces, and one of the surfaces is a polished surface and another of the surfaces is a prismatic surface.

8. The strip light with the light-emitting angle adjusting function as claimed in claim 1, further comprising a plurality of end caps fixed to two ends of the frame base to restrict positions of the side wings.

9. The strip light with the light-emitting angle adjusting function as claimed in claim 8, further comprises a power socket disposed on one side of the end cap.

* * * * *